US011819936B2

(12) United States Patent
Mitsuyasu et al.

(10) Patent No.: US 11,819,936 B2
(45) Date of Patent: Nov. 21, 2023

(54) WIRE ELECTRODE FEEDING APPARATUS AND WIRE ELECTRODE FEEDING METHOD

(71) Applicant: Seibu Electric & Machinery Co., Ltd., Fukuoka (JP)

(72) Inventors: Takashi Mitsuyasu, Fukuoka (JP); Yoshihiro Ito, Fukuoka (JP)

(73) Assignee: Seibu Electric & Machinery Co., Ltd., Fukuoka (JP)

( * ) Notice: Subject to any disclaimer, the term of this patent is extended or adjusted under 35 U.S.C. 154(b) by 160 days.

(21) Appl. No.: 17/275,529

(22) PCT Filed: Mar. 11, 2020

(86) PCT No.: PCT/JP2020/010658
§ 371 (c)(1),
(2) Date: Mar. 11, 2021

(87) PCT Pub. No.: WO2020/203132
PCT Pub. Date: Aug. 10, 2020

(65) Prior Publication Data
US 2022/0118538 A1    Apr. 21, 2022

(30) Foreign Application Priority Data

Mar. 29, 2019  (JP) ................................. 2019-067697
Feb. 25, 2020  (JP) ................................. 2020-029226

(51) Int. Cl.
*B23H 7/10*    (2006.01)
(52) U.S. Cl.
CPC ............. *B23H 7/105* (2013.01); *B23H 7/101* (2013.01)
(58) Field of Classification Search
CPC ........ B23H 7/105; B23H 7/101; B23H 7/108; B32H 7/10; B65H 23/24
See application file for complete search history.

(56) References Cited

U.S. PATENT DOCUMENTS

| 4,698,476 A | 10/1987 | Yamamoto et al. |
| 2003/0057187 A1* | 3/2003 | Baiardi ................. B23H 7/108 |
| | | 219/69.12 |

(Continued)

FOREIGN PATENT DOCUMENTS

| CN | 103874555 A | 6/2014 |
| CN | 106029274 A | 10/2016 |

(Continued)

OTHER PUBLICATIONS

Machine translation of JP-09262721-A, May 2023 (Year: 2023).*

(Continued)

*Primary Examiner* — Geoffrey S Evans
(74) *Attorney, Agent, or Firm* — Rankin, Hill & Clark LLP

(57) ABSTRACT

A wire electrode feeding apparatus or the like is provided, suitable for feeding a wire electrode along its original path without deviating from its original path. A conversion unit 9 feeds the wire electrode from a feeding inlet 21 to a feeding outlet 25 using a machining liquid. A roller 23 changes the feeding direction of the wire electrode. A discharging unit 27 discharges the machining liquid toward the feeding outlet 25 in a direction tangential to the contact face of the roller 23, to generate a flow of the machining liquid. On the other hand, a diverted flow path for the machining liquid is defined along the contact face of the roller 23 from the feeding outlet 25 side to the feeding inlet 21 side. An intake unit 29 takes in air according to the pressure of the machining liquid to supply the air to the diverted flow path.

16 Claims, 6 Drawing Sheets

(56) References Cited

U.S. PATENT DOCUMENTS

2014/0224669 A1    8/2014   Nakajima et al.
2014/0305908 A1   10/2014   Nakajima et al.
2018/0126473 A1    5/2018   Yamane

FOREIGN PATENT DOCUMENTS

| | | | |
|---|---|---|---|
| CN | 106029275 | A | 10/2016 |
| CN | 108057934 | A | 5/2018 |
| JP | H03-49830 | | 3/1991 |
| JP | 3-234425 | A | 10/1991 |
| JP | 5-301120 | A | 11/1993 |
| JP | 7-276146 | A | 10/1995 |
| JP | 9-262721 | A | 10/1997 |
| JP | 09262721 | A * | 10/1997 |
| JP | 2001-277050 | | 10/2001 |
| JP | 5062384 | B1 | 10/2012 |
| WO | 2014/167724 | A1 | 10/2014 |

OTHER PUBLICATIONS

Korean Office Action dated Oct. 14, 2022 issued in Korean patent application No. 10-2021-7007199 and its machine English translation.

Japanese Office Action (JPOA) dated Dec. 14, 2022 issued in Japanese patent application No. 2020-029226 and ts machine English translation.

Extended European Search Report (EESR) dated Dec. 6, 2022 issued in European patent application No. 20782066.3.

Chinese Office Action (CNOA) dated Feb. 6, 2023 for Chinese Patent Application No. 202080005149.2; English machine translation.

English machine translation of Japanese Office Action (JPOA) dated Sep. 4, 2019 for corresponding Japanese Patent Application No. 2019-067697.

International Search Report (ISR) dated May 26, 2020 filed in PCT/JP2020/010658.

* cited by examiner

WIRE ELECTRODE FEEDING APPARATUS AND WIRE ELECTRODE FEEDING METHOD

TECHNICAL FIELD

The present invention relates to a wire electrode feeding apparatus and a wire electrode feeding method, and particularly to a wire electrode feeding apparatus or the like configured to feed a wire electrode.

BACKGROUND ART

When a wire electrical discharge machining device feeds a wire electrode, in some cases, the wire electrode winds around a roller configured to change the feeding direction of the wire electrode. A technique is described in Patent document 1 in which, after the roller is rotated according to the supply of a fluid, the rotation is suppressed so as to reduce or stop the rotational operation of the roller, thereby preventing the wire electrode from winding around the roller.

CITATION LIST

Patent Literature

[Patent Document 1]
Japanese Patent No. 5,062,384

SUMMARY OF INVENTION

Technical Problem

However, such an arrangement involves deviation of the wire electrode from an original path. In this case, the wire electrode winds around the roller. According to the present inventor's experiments, even in a case in which the rotational operation is suppressed after the roller is rotated according to the technique as described in Patent document 1, in some cases, the wire electrode still winds around the roller. That is to say, such an arrangement that controls the rotation of the roller does not sufficiently prevent the wire electrode from deviating from its original path.

Accordingly, it is a purpose of the present invention to provide a wire electrode feeding apparatus or the like suitable for feeding a wire electrode along its original path without deviation from the original path when the wire electrode is to be fed via a path from a feeding inlet to a feeding outlet.

Solution of Problem

A first aspect of the present invention relates to a wire electrode feeding apparatus configured to feed a wire electrode from a feeding inlet to a feeding outlet using a first fluid. The wire electrode feeding apparatus includes a fluid supply unit configured to supply a second fluid. The fluid supply unit supplies the second fluid to the first fluid arranged in a diverted flow path diverted from a path of the wire electrode from the feeding inlet up to the feeding outlet.

A second aspect of the present invention relates to the wire electrode feeding apparatus according to the first aspect. The fluid supply unit is configured to reduce or stop the transfer of the first fluid via the diverted flow path.

A third aspect of the present invention relates to the wire electrode feeding apparatus according to the first or second aspect. The wire electrode feeding apparatus includes a roller configured to change the feeding direction of the wire electrode in a path of the wire electrode. The diverted flow path is configured as a flow path defined along a contact face of the roller that is not on the path of the wire electrode.

A fourth aspect of the present invention relates to the wire electrode feeding apparatus according to any one of the first through third aspects. The wire electrode feeding apparatus includes a discharging unit configured to discharge the first fluid toward the feeding outlet via the path of the wire electrode. The diverted flow path is diverted from a location between the discharging unit and the feeding outlet on the path of the wire electrode.

A fifth aspect of the present invention relates to the wire electrode feeding apparatus according to any one of the first through fourth aspects. The pressure of the first fluid in the diverted flow path to which the second fluid is to be supplied by the fluid supply unit is lower than the pressure of the first fluid at a position from which the diverted flow path is diverted.

A sixth aspect of the present invention relates to the wire electrode feeding apparatus according to any one of the first through fifth aspects. The fluid supply unit supplies the second fluid according to the pressure of the first fluid in the diverted flow path.

A seventh aspect of the present invention relates to the wire electrode feeding apparatus according to the sixth aspect. The fluid supply unit is configured as a one-way valve, and is configured to supply the second fluid using the difference between the pressure of the second fluid and the pressure of the first fluid.

An eighth aspect of the present invention relates to the wire electrode feeding apparatus according to the sixth or seventh aspect. The wire electrode feeding apparatus includes a discharging unit configured to discharge the first fluid to a part of or all of the path of the wire electrode. The pressure of the first fluid in the diverted flow path is due to discharging of the first fluid from the discharging unit toward the feeding outlet in a state in which the wire electrode feeding apparatus is filled with the first fluid.

A ninth aspect of the present invention relates to the wire electrode feeding apparatus according to any one of the first through eighth aspects. The first fluid is configured as a liquid. The second fluid is configured as a gas.

A tenth aspect of the present invention relates to a wire electrode feeding method employed for a wire electrode feeding apparatus configured to feed a wire electrode from a feeding inlet to a feeding outlet using a first fluid. The wire electrode feeding apparatus includes a fluid supply unit configured to supply a second fluid. The wire electrode feeding method includes supplying the second fluid by the fluid supply unit to the first fluid arranged in a diverted flow path diverted from a path of the wire electrode from the feeding inlet up to the feeding outlet.

An eleventh aspect of the present invention relates to the wire electrode feeding method according to the tenth aspect. The fluid supply unit is configured to reduce or stop the transfer of the first fluid via the diverted flow path.

A twelfth aspect of the present invention relates to the wire electrode feeding method according to the tenth or eleventh aspect. The wire electrode feeding apparatus includes a roller configured to change the feeding direction of the wire electrode in a path of the wire electrode. The diverted flow path is configured as a flow path defined along a contact face of the roller that is not on the path of the wire electrode.

A thirteenth aspect of the present invention relates to the wire electrode feeding method according to any one of the tenth through twelfth aspects. The wire electrode feeding apparatus includes a discharging unit configured to discharge the first fluid toward the feeding outlet via the path of the wire electrode. The diverted flow path is diverted from a location between the discharging unit and the feeding outlet on the path of the wire electrode.

A fourteenth aspect of the present invention relates to the wire electrode feeding method according to any one of the tenth through thirteenth aspects. The pressure of the first fluid in the diverted flow path to which the second fluid is to be supplied by the fluid supply unit is lower than the pressure of the first fluid at a position from which the diverted flow path is diverted.

A fifteenth aspect of the present invention relates to the wire electrode feeding method according to any one of the tenth through fourteenth aspects. The fluid supply unit supplies the second fluid according to the pressure of the first fluid in the diverted flow path.

A sixteenth aspect of the present invention relates to the wire electrode feeding method according to the fifteenth aspect. The fluid supply unit is configured as a one-way valve, and is configured to supply the second fluid using the difference between the pressure of the second fluid and the pressure of the first fluid.

A seventeenth aspect of the present invention relates to the wire electrode feeding method according to the fifteenth or sixteenth aspect. The wire electrode feeding apparatus includes a discharging unit configured to discharge the first fluid to a part of or all of the path of the wire electrode. The pressure of the first fluid in the diverted flow path is due to discharging of the first fluid from the discharging unit in a state in which the wire electrode feeding apparatus is filled with the first fluid.

An eighteenth aspect of the present invention relates to the wire electrode feeding method according to any one of the tenth through seventeenth aspects. The first fluid is configured as a liquid. The second fluid is configured as a gas.

It should be noted that the present invention can be regarded as a wire electrode feeding apparatus configured to feed a wire electrode from a feeding inlet to a feeding outlet using a first fluid. The wire electrode feeding apparatus includes a roller configured to change the feeding direction of the wire electrode, and a fluid supply unit configured to supply a second fluid. The fluid supply unit supplies the second fluid to a diverted flow path for the first fluid diverted from the path of the wire electrode according to the pressure of the first fluid.

Advantageous Effects of Invention

With each aspect of the present invention, the fluid supply unit supplies the second fluid to the diverted flow path, thereby allowing the wire electrode to be fed along the path thereof.

With the present invention, in a state in which the second fluid is supplied to the diverted flow path in addition to the first fluid, such an arrangement suppresses the flow of the first fluid from the diversion point to the diverted flow path as compared with a state in which only the first fluid is supplied to the diverted flow path, for example. This arrangement is capable of preventing the wire electrode from deviating to the diverted flow path from the diversion point. It should be noted that the present invention is not restricted to an arrangement configured to prevent a wire electrode from winding around a roller.

DESCRIPTION OF EMBODIMENTS

Description will be made with reference to the drawings regarding examples of the present invention. It should be noted that an embodiment of the present invention is not restricted to the examples described below.

EXAMPLES

FIG. 1A is a diagram showing an example configuration of a wire electrical discharge machining device according to an embodiment of the present invention. FIG. 1B is a diagram showing an example configuration of a conversion unit 9. FIG. 1C is a flowchart showing an example of the operation of the wire electrical discharge machining device.

Referring to FIG. 1A, the wire electrical discharge machining device 1 includes an upper head unit 3, a machining bath 5, a lower head unit 7, a conversion unit 9 (an example of a "wire electrode feeding apparatus" in the present claims), a guide pipe 11, and a collecting unit 13.

With the wire electrical discharge machining device 1, the upper head unit 3 and the lower head unit 7 are not configured to move. Instead, the wire electrical discharge machining device 1 moves a workpiece 15, and performs electrical discharge machining of the workpiece 15.

A wire electrode 17 is drawn from an unshown wire bobbin onto the upper head unit 3 via various kinds of rollers or the like. The wire electrode 17 is annealed before it reaches the upper head unit 3. The wire electrode 17 is fed downward from the upper head unit 3 to the lower head unit 7, following which it is further fed downward. The conversion unit 9 converts the direction of movement (feeding direction) of the wire electrode from the downward direction to the rightward direction. The wire electrode 17 is collected by the collecting unit 13 via the guide pipe 11.

FIG. 1B is a diagram showing an example configuration of the conversion unit 9. The conversion unit 9 includes a feeding inlet 21 (an example of a "feeding inlet" in the present claims), a roller 23 (an example of a "roller" in the present claims), a feeding outlet 25 (an example of a "feeding outlet" in the present claims), a discharging unit 27 (an example of a "discharging unit" in the present claims), and an intake unit 29 (an example of an "intake unit" in the present claims). Specific description will be made later with reference to FIG. 3 regarding an example of the operation of the conversion unit 9.

Description will be made with reference to FIG. 1C regarding an example of the operation of the wire electrical discharge machining device 1 shown in FIG. 1A. First, a machining liquid (an example of a "first fluid" in the present claims) is supplied to the machining bath 5, so as to fill the lower head unit 7 and the conversion unit 9 with the machining liquid (Step ST1). The conversion unit 9 is arranged as an external component of the machining bath 5. Accordingly, the conversion unit 9 is configured such that the machining liquid follows a path from the feeding inlet 21 up to the feeding outlet 25 without leaking.

The discharging unit 27 starts to discharge the machining liquid toward the feeding outlet 25 in a direction tangential to the roller 23 (Step ST2). The roller 23 is rotated in a counterclockwise direction. Various pressures occur in the machining liquid with which the conversion unit 9 is filled.

The intake unit 29 supplies air (an example of a "second fluid" in the present claims) to a gap between a contact face of the roller 23 and a casing (Step ST3). Here, the contact face represents a face of the roller 23 with which the wire electrode is to come in contact. The casing is configured to cover at least a part of or all of a portion of the contact face of the roller 23 that is not on the wire electrode path.

The conversion unit 9 draws the wire electrode 17 downward from the feeding inlet 21, converts the feeding direction from the downward direction to the rightward direction by means of the roller 23, and feeds the wire electrode 17 to the feeding outlet 26 (Step ST4).

Figure 2:
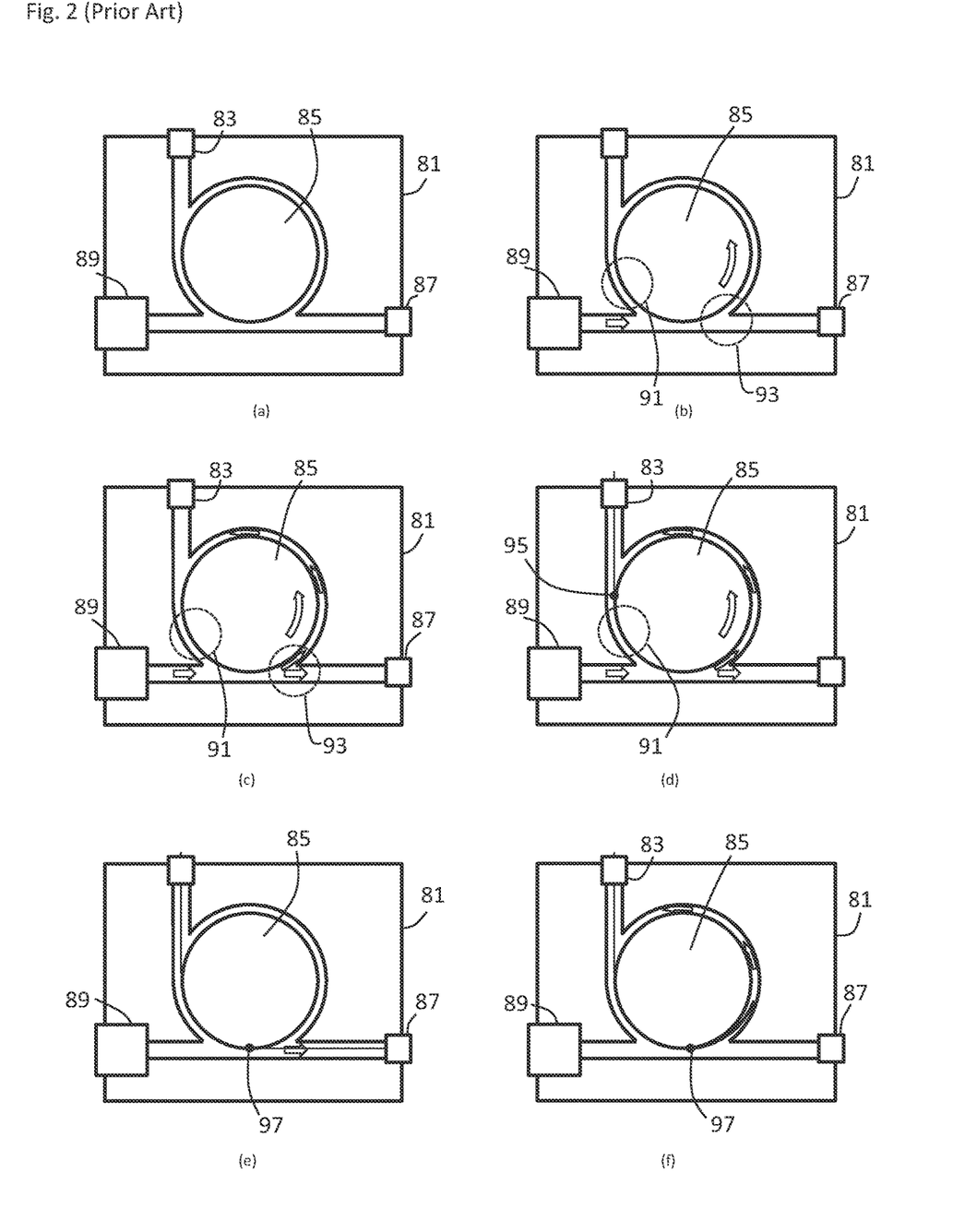
FIG. 2 is a diagram for explaining an example of the operation of a conversion unit 81 according to a conventional technique.

Description will be made with reference to FIG. 2 regarding an example of the operation of a conventional conversion unit 81. Referring to FIG. 2A, the conversion unit 81 includes a feeding inlet 83, a roller 85, a feeding outlet 87, and a discharging unit 89.

Referring to FIG. 2B, with the conversion unit 81, the discharging unit 89 discharges a machining liquid toward the feeding outlet 87 in a direction tangential to the roller 85. The roller 85 is rotated in a counterclockwise direction. A region below the feeding inlet 83 will be referred to as a "negative-pressure portion 91". A region below the roller 85 will be referred to as a "high-pressure portion 93".

As shown in FIG. 2C, after the machining liquid is discharged from the discharging unit 89, there are two flow paths. One is a flow path via which the machining liquid is fed from the discharging unit 89 toward the feeding outlet 87. The other is a flow path via which the machining liquid is diverted from the aforementioned flow path, and is transferred from the high-pressure portion 93 toward the negative-pressure portion 91 while rotating in a counterclockwise manner along the contact face of the roller 85. The high-pressure portion 93 is a position where the machining liquid discharged from the discharging unit 89 is diverted.

Referring to FIG. 2D, the wire electrode fed from the feeding inlet 83 is fed downward by means of the negative-pressure portion 91. The wire electrode comes in contact with the contact face of the roller 85 at the first position 95, and the direction of movement is changed to the rightward direction according to the rotation of the roller 85 and the flow of the machining liquid discharged by the discharging unit 89.

As shown in FIG. 2E, ideally, the wire electrode is fed such that, after the wire electrode is detached from the roller 85 at a second position 97, the wire electrode reaches the feeding outlet 87 following the flow of the machining liquid from the discharging unit 89 toward the feeding outlet 87. However, in actuality, there is another flow of the machining liquid. In this case, the machining liquid is diverted from this ideal flow path, rotates in a counterclockwise manner along the contact face of the roller 85, and returns to the negative-pressure portion 91. This leads to the potential to cause a situation in which the wire electrode winds around the roller 85. The technique described in Patent document 1 has been made directing attention to only a purpose to prevent the wire electrode from winding around the roller 85 due to the rotation of the roller 85. That is to say, this technique has not been made giving consideration to the wire electrode winding around the roller 85 due to the flow of the machining liquid. With such a technique as described in Patent document 1 in which the rotation of the roller 85 is suppressed, such an arrangement is not capable of sufficiently preventing the wire electrode from winding around the roller 85 due to the flow of the machining liquid. Accordingly, it can be considered that, in the experiment performed by the present inventors, such an arrangement was not able to prevent the wire electrode from winding around the roller 85.

Figure 1:
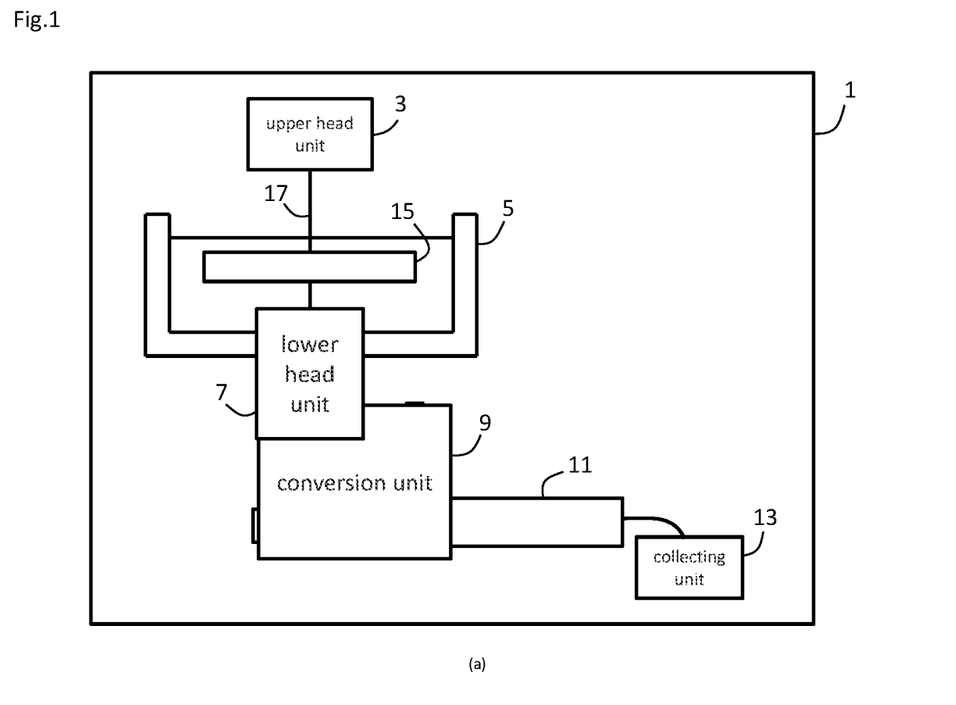
FIG. 1A is a diagram showing an example configuration of a wire electrical discharge machining device 1 according to an embodiment of the present invention.
FIG. 1B is a diagram showing an example configuration of a conversion unit 9.
FIG. 1C is a flowchart showing an example of the operation thereof.

Description will be made with reference to FIG. 3 regarding an example of the operation of the conversion unit 9 shown in FIG. 1. It should be noted that the pressure that occurs in the conversion unit 9 is described for exemplary purposes only. Also, the pressure in the conversion unit 9 may occur due to other causes such as the rotation of the roller 23 or the like.

Referring to FIG. 3A, the conversion unit 9 is filled with a machining liquid (see Step ST1 shown in FIG. 1C). The discharging unit 27 discharges the machining liquid toward the feeding outlet 25 in a direction tangential to the roller 23 (see Step ST2 shown in FIG. 1C). The roller 23 is rotated in a counterclockwise manner. A region below the feeding inlet 21 will be referred to as a "negative-pressure portion 31". A region below the roller 23 will be referred to as a "high-pressure portion 35".

As shown in FIG. 3B, after the machining liquid is discharged from the discharging unit 27, there are two flow paths. One is a flow path via which the machining liquid is fed from the discharging unit 27 toward the feeding outlet 25. The other is a flow path via which the machining liquid is diverted from the aforementioned flow path, and is transferred from the high-pressure portion 35 toward the negative-pressure portion 31 while rotating in a counterclockwise manner along the contact face of the roller 23 (an example of a "diverted flow path" in the present claims; the "diverted flow path" will be also used in the following description). The high-pressure portion 35 is a position where the machining liquid discharged from the discharging unit 27 is diverted.

Figure 3:
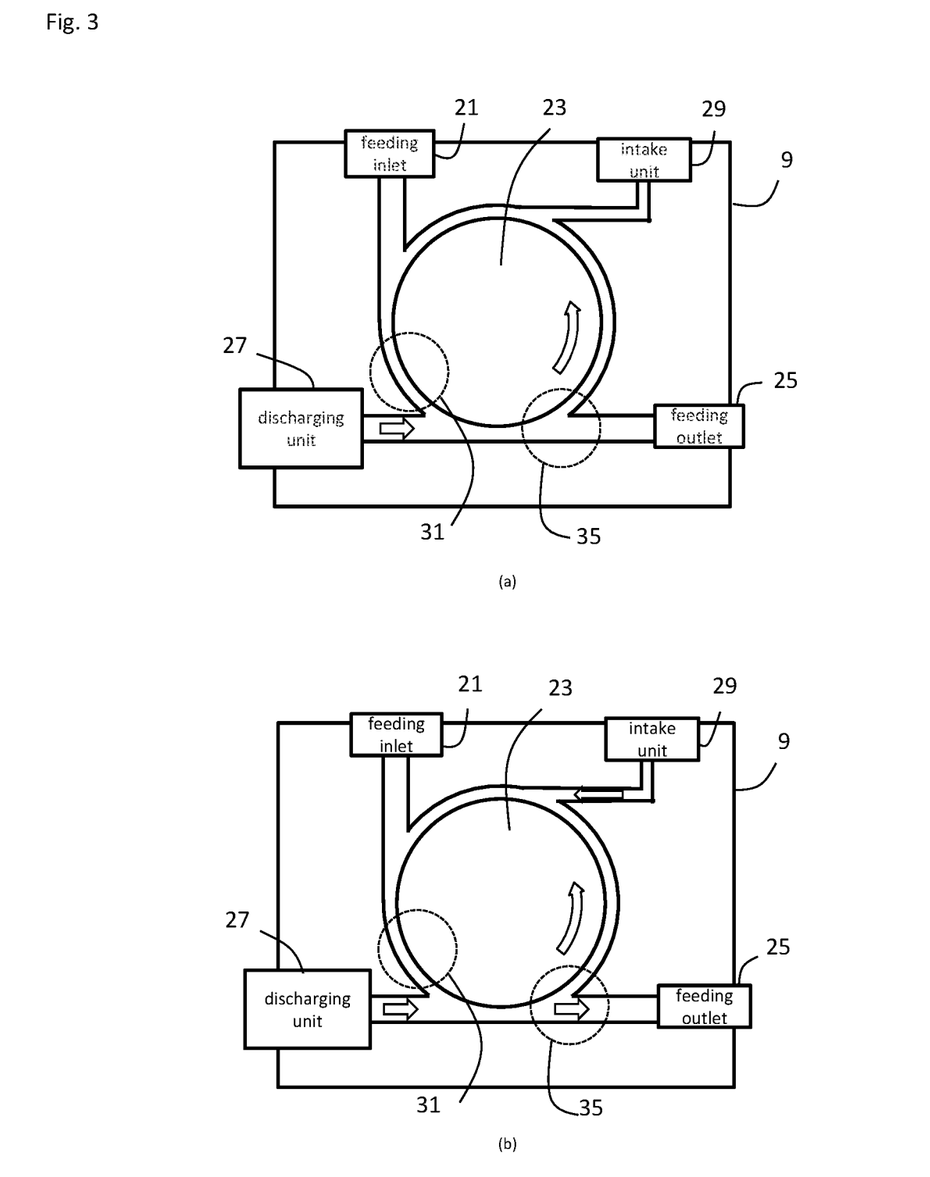
FIG. 3 is a diagram for explaining an example of the operation of the conversion unit 9 shown in FIG. 1.

FIG. 3 shows an example of the diverted flow path configured as a gap defined between the contact face of the roller 23 that is not on the wire electrode path and a casing that covers a part of or all of the contact face thereof. FIG. 3 also shows an example of the contact face of the roller 23 that is not on the wire electrode path, which is defined over a region of the roller 23 along the counterclockwise direction from a second position 39 (an example of a "location on the feeding outlet side on the path of the wire electrode" in the present claims) up to a first position 37 (an example of a "location on the feeding inlet side of the path of the wire electrode" in the present claims).

The intake unit 29 is configured as a one-way valve (chuck valve). Specifically, the intake unit 29 is configured to transfer a gas into an internal space of the machining device from the exterior thereof. The intake unit 29 draws in air by natural aspiration using the pressure difference between the atmospheric pressure and the pressure of the machining liquid arranged in the diverted flow path, thereby supplying air to the diverted flow path (see Step ST3 in FIG. 1C). The intake unit 29 supplies air to the diverted flow path so as to suppress (reduce) the flow of the machining liquid in the diverted flow path, and prevents the flow thereof as much as possible.

Referring to FIG. 3C, the wire electrode inserted via the feeding inlet 21 is fed downward by the negative-pressure portion 31. Subsequently, when the wire electrode reaches the first position 37 on the left side of the roller 23, the wire electrode comes in contact with the contact face of the roller 23. The direction of movement (feeding direction) is changed to the rightward direction according to the rotation of the roller 23 or the like (see Step ST4 shown in FIG. 1C).

With the conversion unit 9, the intake unit 29 suppresses the flow of the machining liquid in the diverted flow path. Accordingly, as shown in FIG. 3D, after the wire electrode is detached from the roller 23 at the second position 39 which is below the roller 23, the wire electrode is fed toward the feeding outlet 25 following the flow of the machining liquid that flows from the discharging unit 27 toward the feeding outlet 25. The transfer path of the wire electrode from the feeding inlet 21 up to the feeding outlet 25 is configured as an example of the "wire electrode path" in the present claims.

It should be noted that, with the present invention, the second fluid to be supplied by the fluid supply unit may be configured as a liquid. Such a liquid may be configured as the machining liquid, or may be configured as a liquid that differs from the machining liquid. Similarly, the first fluid may be configured as the machining liquid, a liquid that differs from the machining liquid, or a gas. Also, the fluid supply unit may be configured to apply a predetermined pressure (e.g., a pressure that is higher than the pressure of the machining liquid in the diverted flow path) to the second fluid so as to provide a state in which the pressure of the second fluid is higher than the pressure of the first fluid in the diverted flow path, so as to supply the second fluid. Also, the fluid supply unit may be configured to measure or calculate the pressure of the first fluid in the diverted flow path, and to supply the second fluid with an amount that corresponds to the measurement value or the calculated value.

Figure 4:
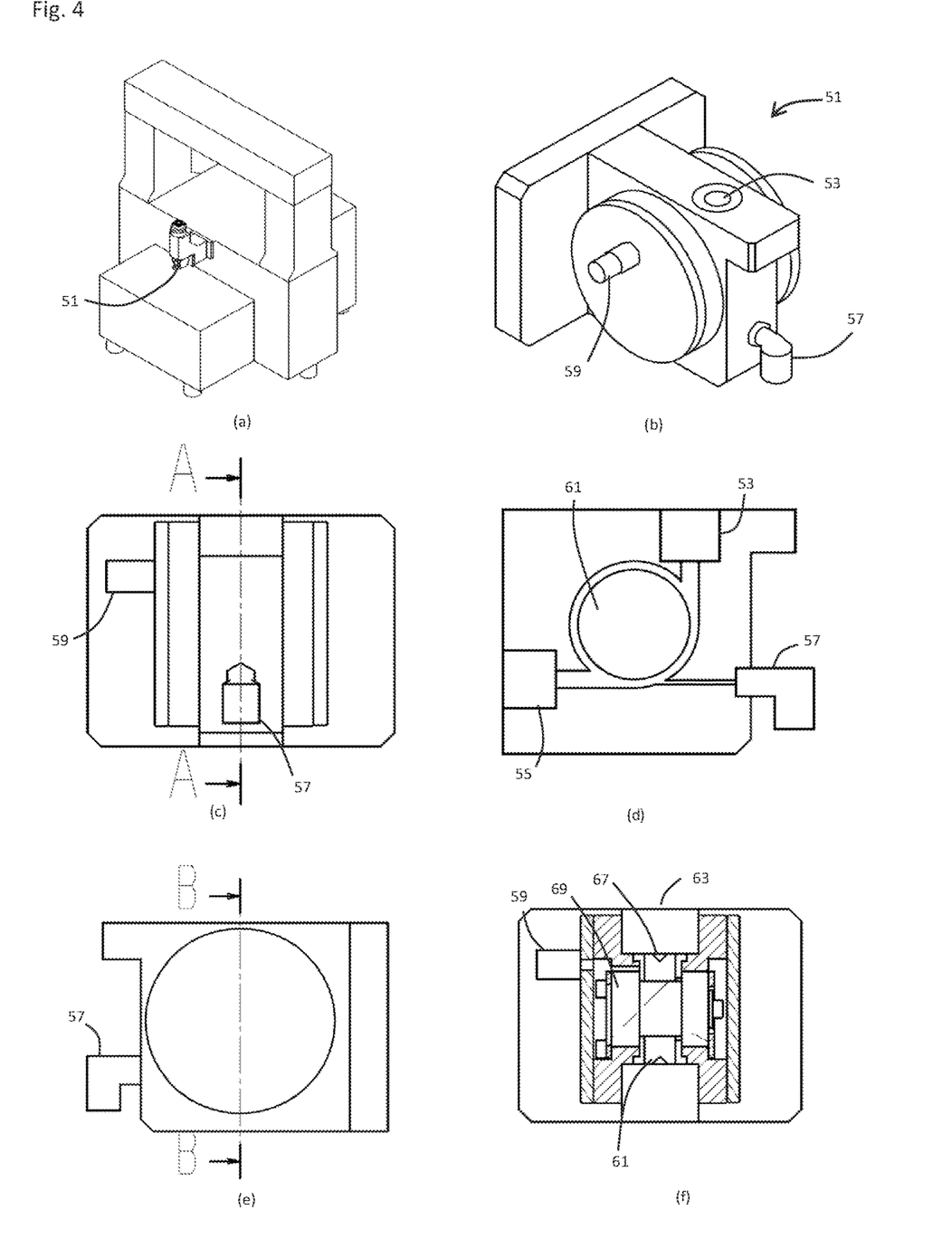
FIG. 4 is a diagram showing a specific example of the conversion unit 9 shown in FIG. 1.

Description will be made with reference to FIG. 4 regarding a specific example of the wire electrical discharge machining device. FIG. 4A shows an external configuration of the wire electrical discharge machining device. The wire electrical discharge machining device includes a conversion unit 51 (an example of a "wire electrode feeding apparatus" in the present claims) arranged below a lower head unit.

The conversion unit 51 includes a roller 61 (an example of a "roller" in the present claims), a feeding inlet 53 (an example of a "feeding inlet" in the present claims"), a discharging opening 57, a feeding outlet 55 (an example of a "feeding outlet" in the present claims), an intake unit 59 (an example of a "fluid supply unit" in the present claims), and a casing unit 63. The machining liquid discharged from the discharging unit (an example of a "discharging unit" in the present claims) enters the discharging opening 57. The casing unit 63 is arranged such that it covers at least an upper-side portion of the roller 61 (see FIG. 4F).

FIG. 4B is a perspective diagram showing the conversion unit 51. FIG. 4B shows an example in which the feeding inlet 53 is arranged on an upper portion of the conversion unit 51, the discharging opening 57 is arranged on a front face thereof, and the intake unit 59 is arranged on a side face thereof.

FIG. 4C shows the position of a line A-A. FIG. 4D is a cross-sectional view taken along the line A-A. The conversion unit 9 is filled with the machining liquid. The machining liquid discharged from the discharging unit is input to the conversion unit 51 via the discharging opening 57. The machining liquid input from the discharging opening 57 is transferred toward the feeding outlet 55 in a direction tangential to the roller 61.

FIG. 4E shows the position of a line B-B. FIG. 4F is a cross-sectional view taken along the line B-B. The air taken in by the intake unit 59 is supplied to a gap 67 defined between a groove formed in an upper portion of the roller 61 and the casing unit 63. That is to say, in FIG. 4F, the intake unit 59 is arranged at a position on an upper-left side of the roller 61. The intake unit 59 takes in air from the exterior of the device into an internal space of the device using the pressure of the machining liquid. The air thus taken in moves toward the right side via a space defined by a rotating mechanism 69 of the roller 61. After the air goes beyond the rotating mechanism 69, the air moves toward an upper portion of the roller 61, and reaches the gap 67 between the groove formed in the contact face of the roller 61 and the casing unit 63. The gap 67 is positioned in the diverted flow path formed in the conversion unit 51.

The present inventors performed an automatic wire connection experiment using a thin wire electrode (ϕ0.05 or less). In a case in which the machining bath was not filled with the machining liquid (oil), an upper/lower guide portion exhibited a tendency of a degraded rate of automatic wire connection. However, such a case involved no occurrence of winding of the thin wire electrode in the conversion unit (direction-changing roller unit) (lower roller) (see roller 85 shown in FIG. 2). In a case in which the machining bath was filled with the machining liquid, the upper/lower guide was capable of supporting automatic wire connection. However, even in a case in which the conversion unit performed a rotational control operation (suspension of the rotation or the like) (see Patent document 1), such an arrangement exhibited only a low automatic wiring ratio. In contrast, with such an arrangement as described in the present invention in which air is taken in by natural aspiration from a position that differs from a discharging position, this involves no occurrence of tangling (winding) in the conversion unit even in a case in which the machining bath is filled with the machining liquid.

TABLE 1

|  |  | UPPER/ LOWER GUIDE PORTION | DIRECTION- CHANGING ROLLER UNIT |
|---|---|---|---|
| PRESENT EXAMPLE | WITH MACHINING LIQUID | ○ | ○ |
| CONVENTIONAL TECHNIQUE | WITH MACHINING LIQUID | ○ | x |
|  | WITHOUT MACHINING LIQUID | △ | ○ |

The present invention is not restricted to such an arrangement configured to prevent a wire electrode from winding around a roller. With the present invention, the second fluid is supplied in addition to the first fluid to the diverted flow path diverted at a diversion point (diversion position) from an ideal path, so as to suppress the flow of the first fluid to the diverted flow path via the diversion point, as compared with a state in which only the first fluid is supplied to the diverted flow path, for example. This arrangement is capable of preventing the wire electrode from deviating to the diverted flow path via the diversion point. For example, in a case in which the pressure of the first fluid in the diverted flow path is lower than the pressure of the first fluid at the diversion point, typically, in many cases, this leads to the occurrence of the flow of the first fluid to the diverted flow path via the diversion point. With the present invention, the fluid supply unit supplies the second fluid to the diverted flow path such that the pressure of the first fluid and the second fluid in the diverted flow path approaches the pressure of the first fluid at the diversion point. This suppresses the flow of the first fluid to the diverted flow path, thereby preventing the wire electrode from deviating to the diverted flow path. Description has been made with reference to FIG. 3 or the like regarding an example in which the pressure of the first fluid in the diverted flow path is lower than the pressure of the first fluid at the diversion point.

It should be noted that the present invention can be regarded as a wire electrode feeding apparatus configured to feed a wire electrode from a feeding inlet to a feeding outlet using a first fluid, in order to provide such a wire electrode feeding apparatus or the like suitably employed for preventing the wire electrode from winding around a roller. The wire electrode feeding apparatus includes a roller configured to change the feeding direction of the wire electrode, and a fluid supply unit configured to supply a second fluid. The fluid supply unit supplies the second fluid to a diverted flow path for the first fluid diverted from a path of the wire electrode according to the pressure of the first fluid. The diverted flow path is configured as a flow path for the first fluid defined from a location on the feeding outlet side up to a location on the feeding inlet side on the wire electrode path. The fluid supply unit is configured to supply the second fluid according to the pressure of the first fluid in the diverted flow path, so as to reduce or stop of the transfer of the first fluid via the diverted flow path. The above-described location on the feeding outlet side on the wire electrode path is configured as a location at which the wire electrode is not in contact with the contact face of the roller. The above-described position on the feeding inlet side on the wire electrode path is configured as a position at which the wire electrode comes in contact with the contact face of the roller. The fluid supply unit is configured to supply the second fluid to a part of or all of the contact face of the roller that is not on the wire electrode path.

REFERENCE SIGNS LIST

1 wire electrical discharge machining device, 3 upper head portion, 5 machining bath, 7 lower head portion, 9 conversion unit, 11 guide pipe, 13 collecting unit, 15 workpiece, 17 wire electrode, 21 feeding inlet, 23 roller, 25 feeding outlet, 27 discharging unit, 29 intake unit, 31 negative-pressure portion, 35 high-pressure portion, 37 first portion, 39 second portion, 51 conversion unit, 53 feeding inlet, 55 feeding outlet, 57 discharging opening, 59 intake unit, 61 roller, 63 casing unit, 67 gap, 69 rotating mechanism, 81 conversion unit, 83 feeding inlet, 85 roller, 87 feeding outlet, 89 discharging unit, 91 negative-pressure portion, 93 high-pressure portion, 95 first portion, 97 second portion.

The invention claimed is:

1. A wire electrode feeding apparatus configured to feed a wire electrode from a feeding inlet to a feeding outlet using a first fluid, comprising a fluid supply unit configured to supply a second fluid,
wherein the fluid supply unit supplies the second fluid to the first fluid arranged in a diverted flow path diverted from a path of the wire electrode ranging from the feeding inlet up to the feeding outlet, and
wherein the fluid supply unit is configured to reduce or stop a transfer of the first fluid via the diverted flow path.

2. The wire electrode feeding apparatus according to claim 1, comprising a roller configured to change a feeding direction of the wire electrode in a path of the wire electrode,
wherein the diverted flow path is configured as a flow path defined along a contact face of the roller that is not on the path of the wire electrode.

3. The wire electrode feeding apparatus according to claim 1, comprising a discharging unit configured to discharge the first fluid toward the feeding outlet via the path of the wire electrode,
wherein the diverted flow path is diverted from a location between the discharging unit and the feeding outlet on the path of the wire electrode.

4. The wire electrode feeding apparatus according to claim 1, wherein a pressure of the first fluid in the diverted flow path to which the second fluid is to be supplied by the fluid supply unit is lower than a pressure of the first fluid at a position from which the diverted flow path is diverted.

5. The wire electrode feeding apparatus according to claim 1, wherein the fluid supply unit supplies the second fluid according to a pressure of the first fluid in the diverted flow path.

6. The wire electrode feeding apparatus according to claim 5, wherein the fluid supply unit is configured as a one-way valve, and is configured to supply the second fluid using a difference between a pressure of the second fluid and a pressure of the first fluid.

7. The wire electrode feeding apparatus according to claim 5, comprising a discharging unit configured to discharge the first fluid to a part of or all of the path of the wire electrode,
wherein the pressure of the first fluid in the diverted flow path is due to discharging of the first fluid from the discharging unit toward the feeding outlet in a state in which the wire electrode feeding apparatus is filled with the first fluid.

8. The wire electrode feeding apparatus according to claim 1, wherein the first fluid is configured as a liquid, and wherein the second fluid is configured as a gas.

9. A wire electrode feeding method employed for a wire electrode feeding apparatus configured to feed a wire electrode from a feeding inlet to a feeding outlet using a first fluid, wherein the wire electrode feeding apparatus comprises a fluid supply unit configured to supply a second fluid,
wherein the wire electrode feeding method comprises supplying the second fluid by the fluid supply unit to the first fluid arranged in a diverted flow path diverted from a path of the wire electrode from the feeding inlet up to the feeding outlet, and
wherein the fluid supply unit is configured to reduce or stop a transfer of the first fluid via the diverted flow path.

10. The wire electrode feeding method according to claim 9, wherein the wire electrode feeding apparatus comprises a roller configured to change a feeding direction of the wire electrode in a path of the wire electrode,
wherein the diverted flow path is configured as a flow path defined along a contact face of the roller that is not on the path of the wire electrode.

11. The wire electrode feeding method according to claim 9, wherein the wire electrode feeding apparatus comprises a discharging unit configured to discharge the first fluid toward the feeding outlet via the path of the wire electrode,
  wherein the diverted flow path is diverted from a location between the discharging unit and the feeding outlet on the path of the wire electrode.

12. The wire electrode feeding method according to claim 9, wherein a pressure of the first fluid in the diverted flow path to which the second fluid is to be supplied by the fluid supply unit is lower than a pressure of the first fluid at a position from which the diverted flow path is diverted.

13. The wire electrode feeding method according to claim 9, wherein the fluid supply unit supplies the second fluid according to a pressure of the first fluid in the diverted flow path.

14. The wire electrode feeding method according to claim 13, wherein the fluid supply unit is configured as a one-way valve, and is configured to supply the second fluid using a difference between a pressure of the second fluid and a pressure of the first fluid.

15. The wire electrode feeding method according to claim 13, wherein the wire electrode feeding apparatus comprises a discharging unit configured to discharge the first fluid to a part of or all of the path of the wire electrode,
  and wherein the pressure of the first fluid in the diverted flow path is due to discharging of the first fluid from the discharging unit in a state in which the wire electrode feeding apparatus is filled with the first fluid.

16. The wire electrode feeding a method according to claim 9, wherein the first fluid is configured as a liquid,
  and wherein the second fluid is configured as a gas.

* * * * *